United States Patent [19]

Sawmiller et al.

[11] 3,734,518
[45] May 22, 1973

[54] STAIR CART

[76] Inventors: Niles E. Sawmiller, 415½ S. West Street, Lima, Ohio 45801; Gary C. Clymer, 202 Elm Street; Larry R. Clymer, 214 North Broadway, both of Columbus, Ohio 45830

[22] Filed: Nov. 12, 1971

[21] Appl. No.: 198,183

[52] U.S. Cl..........................................280/5.3, 187/9
[51] Int. Cl. ................................................B62b 5/02
[58] Field of Search ....................187/9; 280/5.3, 5.2, 280/5.26, 47.12; 180/8 A, 8 B, 8 C, 8 D

[56] References Cited

UNITED STATES PATENTS

| | | | |
|---|---|---|---|
| 3,550,709 | 12/1970 | Hottel | 280/5.3 |
| 2,834,602 | 5/1958 | Hanson | 280/5.3 |
| 2,192,396 | 3/1940 | Burch | 180/8 A |

Primary Examiner—Evon C. Blunk
Assistant Examiner—Merle F. Maffei
Attorney—Richard C. Sughrue, Gideon Franklin Rothwell and John H. Mion

[57] ABSTRACT

A hand truck is provided with a push bar lift assembly for carrying loads vertically up stairs. A U-shaped push bar is positioned between the wheels and lower support frame to provide a downward force against the stairs. A chain and sprocket assembly is connected to the frame through an offset axle and a sliding handle. The operator pulls the handle in the same direction that he desires the load to be moved to effectuate the lifting station.

5 Claims, 5 Drawing Figures

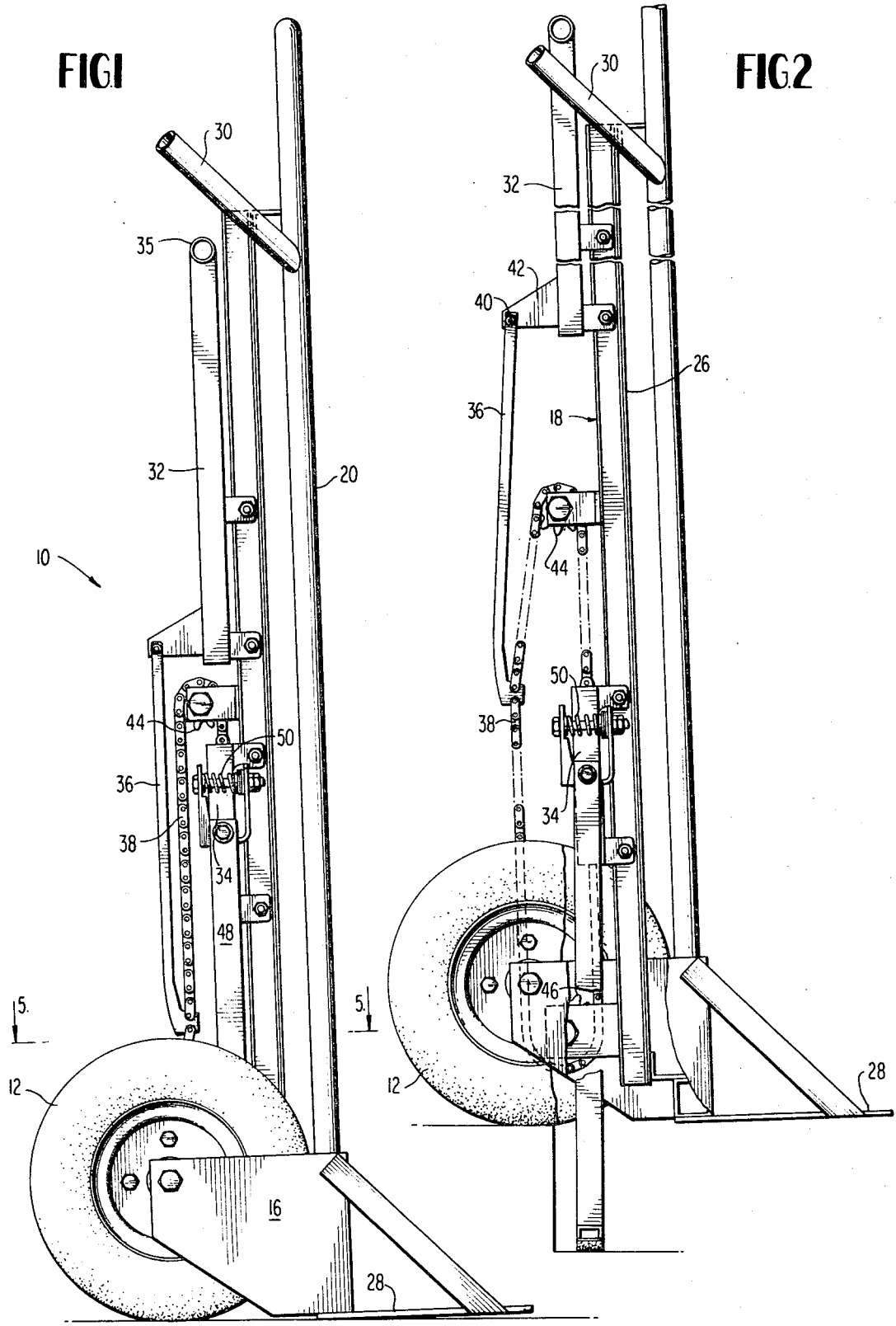

PATENTED MAY 22 1973

STAIR CART

BACKGROUND OF THE INVENTION

1. Field of the Invention

The present invention relates to a hand truck and in particular, to a push bar lift assembly for enabling hand trucks to carry loads up stairs.

2. Description of the Prior Art

Various attempts have been made in the past to provide a simple economical hand truck that is capable of lifting heavy loads vertically up a flight of stairs. The various attempts to achieve this purpose have sometimes taken rather elaborate and complicated forms, such as the Tittes U.S. Pat. No. 3,061,323(1962). Often, mechanical advantages are sought to be achieved by utilizing pivoting members that frequently position the operator in an uncomfortable or dangerous position, with a heavy load on stairs. The Slater U.S. Pat. No. 1,607,851(1926) is illustrative of a pivoting lever hand truck. Various other mechanisms have been utilized in an attempt to obtain a mechanical advantage to assist the operator during the vertical lifting of heavy loads, for example, the Hanson U.S. Pat. No. 2,834,602(1958), discloses an elaborate shoe mechanism that is activated by an operator-pulled cable. The prior art is still searching for a relatively simple and efficient hand truck for lifting heavy loads up vertical steps.

SUMMARY OF THE INVENTION

The present invention provides a sturdy and flexible stair cart or hand truck capable of multiplying the mechanical advantages of the operator for carrying objects vertically up steps. The operator is provided with a handle that permits him to conveniently exert a force in the same direction as the principal supporting frame member. This force is exerted through a sprocket and chain which permits a multiplication of the operator's exerted force. The operator's movements in exerting the lifting force are in the same direction as the movement of the load.

The support frame, itself, consists of a pair of frame tubes, terminating in a load support frame. A pair of reciprocally sliding members are supported on a central track support and interconnected by a chain through an idler gear on the lower end of the central track support. A push bar is pivotably hinged on the lower sliding member, while a handle is positioned on the upper sliding member. Upward movement of the upper sliding member will cause the lower sliding member to exert a force to push downward the inverted U-shaped push bar to contact the step and force the frame member upward. The U-shaped push bar is positioned between the wheels and the lower support frame and pivotably attached to the lower support member to permit a relative movement of the wheels and the push bar as the stair cart advances from step to step. An offset axle helps provide a swing space for the U-shaped push bar. The sliding members are held into position between the two frame tubes by the use of center guide bearings. Spring members can be provided to return the push bar to a neutral position.

BRIEF DESCRIPTION OF THE DRAWINGS

FIG. 1 is a side view of the present invention with the lift mechanism in a neutral position;

FIG. 2 is a side view of the present invention, partly in section, with the lift mechanism elevating the cart vertically upward;

DESCRIPTION OF THE PREFERRED EMBODIMENT

Figure 3:
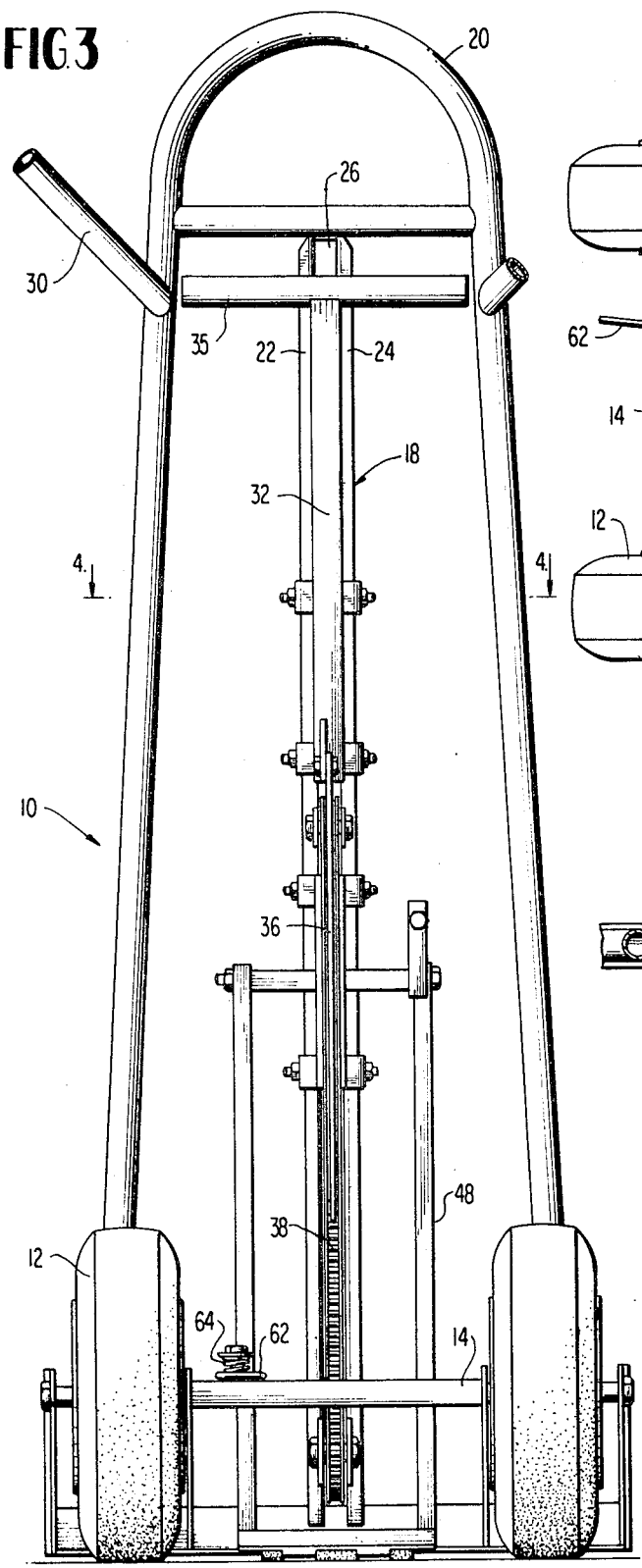
FIG. 3 is a back view of the present invention.
Figure 5:
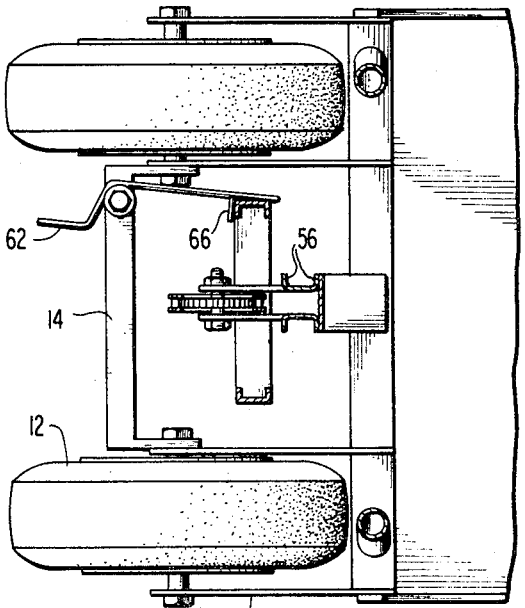
FIG. 5 is a cross-sectional view taken along the lines 5—5 in FIG. 1.
Figure 4:
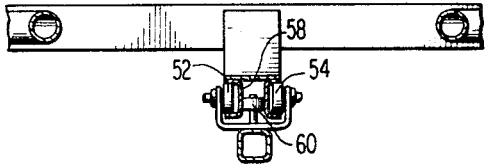
FIG. 4 is a cross-sectional view taken along the lines 4—4 in FIG. 3.

Referring to FIG. 1, a lift truck or hand truck assembly 10 is provided with tires 12 arranged on an offset axle 14. Wheel support members 16 position the tires 12 on the offset axle 14.

A central track support 18 is mounted on the frame members 20 and comprises a pair of U-shaped beams 22 and 24, fastened together by a flat plate 26. The flat plate 26 and the flanges 58 of the U-shaped beams 22 and 24 form a central guide track. A load support member 28 is secured to the bottom of the frame members 20. At the top of the frame members 20, are positioned appropriate handles 30, for the operator.

Attached to the central track support 18 are a pair of sliding members 32 and 34. Sliding member 32 has a pull handle 35 located adjacent the top of the frame members 20. A link 36 is pivotably connected to the lower end of the sliding member 32 and is fastened to a chain 38. The link 36 is pivotably attached to sliding member 32 by an axle 40 on arm 42. Attached halfway down the central track support 18, is a sprocket gear 44, while a second sprocket gear 46 of a larger diameter is positioned at the bottom of the central track support 18. The chain 38 encircles the sprocket gears 44 and 46. On one run of the chain 38, the lever 36 connects the pull handle 35 through the sliding member 32 to the chain 38, while on the other run of the chain 38, the sliding member 34 is directly connected to the chain 38. The sliding member 34 carries a U-shaped member 48 for exerting a downward force as the pull handle 35 is pulled upward. The U-shaped member 48 is pivotably connected so that it is capable of moving relative to the tires 12 and is further spring biased by a spring 50 to urge it into a neutral position adjacent the back end of the load support 28.

Each of the sliding members 32 and 34 are supported on the central track support 18 by two sets of bearing means that include a pair of rollers 52 and 54, that are located within the guide legs 56 of the U-shaped beams 22 and 24. Between the flanges 58 of each U-shaped beam 22 and 24, is located a traversely positioned central roller 60 in the central guide track. Each of these bearing sets insure a sturdy and relatively friction-free motion for lift mechanism of the hand cart 10.

Positioned on the offset axle 14 is a positioning lever 62 that is biased by a spring 64 against any pivotal motion. At the end of the pivoting lever 62 is an arm 66 that is designed to hold the U-shaped member 48 in an inoperative position adjacent the load support 28.

In operation, an operator having a load, such as a gas cylinder, positioned on the load support 28, will, upon reaching the steps which must be vertically ascended, release the positioning lever 62 to free the U-shaped member 48. The operator will move the lift truck 10 until its tires 12 are resting against the edge of the step upon which he desires to ascend. He will then exert an upward force on the pull handle 35 in the longitudinal direction of the frame 20, which will be transmitted through the sliding member 32 and the lever 36 to the chain 38. The force on one side of the chain 38 will be transmitted through the sprocket gear 46 and the sliding member 34 to the pivotably suspended U-shaped member 48. This will cause the tires 12 of the lift truck 10 to be moved upward over the step. Upon reaching the next step, the weight will be released from the U-shaped member 48 and transmitted again to the tires 12, where upon the U-shaped member 48 can be returned to its operative position for the next step by pushing down the pull handle 35. When the weight is released from the U-shaped member 48, it will swing, by virtue of its pivotable connection, backwards adjacent the offset axle 14, and will be ready to be activated against the surface of the next step. By the particular arrangement of the sprocket and U-shaped member, a mechanical force exerted on the pull handle 35 will be multiplied when applied to the U-shaped member 48. Since the pull handle 35 will be moved in the same direction as the resultant movement of the frame member 20, the operator will always be in a safe and comfortable position with respect to the load and stability of the hand truck 10.

While the above description discloses the preferred embodiment of the present invention, it is clear that various modifications can be accomplished by a person skilled in the art within the concepts of the present invention, and therefore, the scope of the present invention should be measured solely from the following claims.

What is claimed is:

1. A light weight hand truck with operated mechanical advantage means for carrying loads up steps and the like, comprising:
    a frame member;
    a pair of wheels connected to the frame member;
    a load support member connected to the frame member;
    a central track support connected between the wheels to the frame member and extending vertically upwardly;
    lift means including a chain, the chain extending around a sprocket supported from the track support near the lower end thereof;
    a handle member connected to one run of the chain and slidably connected to the track support so as to be movable upward, thereby pulling the chain, and
    a push bar assembly connected to the other run of the chain and slidably connected to the track support to move downward when the handle is moved upward, the push bar assembly including a ground engaging push member pivotably connected thereto for exerting a downward force while being swingable relative to the frame member of the hand frame to apply a ground engaging force to a supporting surface for lifting the truck up the steps one at a time, the arrangement being such that exerting an upward force on the handle member will multiply the force for lifting the hand truck up steps.

2. A hand truck as in claim 1 wherein the push bar assembly also includes a bearing member having two guide wheels cooperating with the central track support so that the bearing member is slidable thereon, the bearing member pivotably supporting the ground engaging push member.

3. A hand truck as in claim 1 further including a lock member for preventing pivotal movement of the ground engaging push member.

4. A hand truck as in claim 2 including a second bearing member having guide wheels cooperating with the central track support and slidable thereon, the second bearing member connecting the handle member slidably to the central track support.

5. A hand truck as in claim 1 wherein the pair of wheels are rotatable on an axle which is offset in a direction away from the frame in order to allow for additional pivotal movement of the ground engaging push member.

* * * * *